United States Patent [19]

Yonezawa

[11] Patent Number: 4,592,273
[45] Date of Patent: Jun. 3, 1986

[54] APPARATUS FOR MAKING BREAD

[75] Inventor: Masayuki Yonezawa, Kita Kyush, Japan

[73] Assignee: Newly Weds Foods, Inc., Chicago, Ill.

[21] Appl. No.: 657,495

[22] Filed: Oct. 4, 1984

[30] Foreign Application Priority Data

Nov. 20, 1983 [JP] Japan .......................... 57-204934

[51] Int. Cl.⁴ ............................................. A47J 37/00
[52] U.S. Cl. ................................... 99/358; 99/443 C; 426/244
[58] Field of Search .................. 99/358, 443 C, 373, 99/374, 422, 423; 426/244

[56] References Cited

U.S. PATENT DOCUMENTS 2,103,469 12/1937 Kremer ................................ 99/358
3,424,590 1/1969 Booras .......................... 426/244 X

FOREIGN PATENT DOCUMENTS 845082 7/1952 Fed. Rep. of Germany ........ 99/358
904371 8/1962 United Kingdom .................. 99/358

Primary Examiner—Billy J. Wilhite
Attorney, Agent, or Firm—Mason, Kolehmainen, Rathburn & Wyss

[57] ABSTRACT

Apparatus in accordance with the invention includes an endless belt conveyor having an insulated bottom belt and a pair of insulated, opposite side belts having longitudinally spaced apart, transverse slots therein for receiving removable electrically conductive plates adapted to form opposite sides of a series of moving baking compartments on the belt. Each compartment is adapted for holding a mass of dough in contact with a pair of plates on opposite sides of the dough mass and an electric current source is interconnected to make contact with the conductive plates on opposite sides of each moving compartment to pass an electric current through the dough mass contained in the compartment for baking the dough as it moves along with the conveyor until baking is complete and the plates are removed from the conveyor.

7 Claims, 7 Drawing Figures

U.S. Patent  Jun. 3, 1986  4,592,273
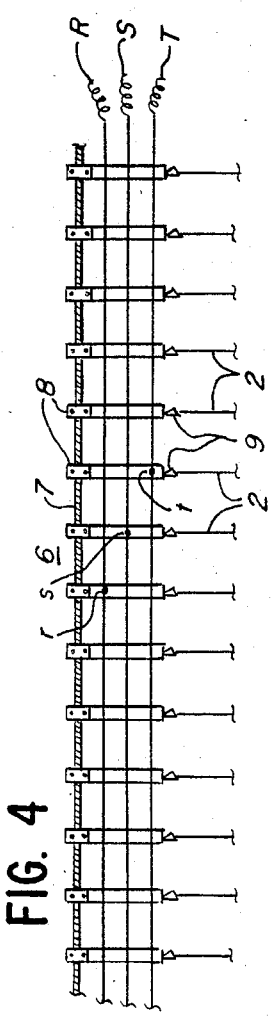
FIG. 1
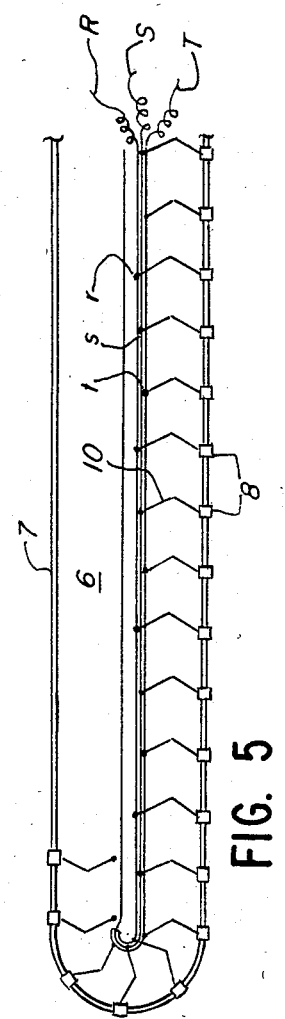
FIG. 4
FIG. 5
FIG. 6 PRIOR ART
FIG. 7 PRIOR ART
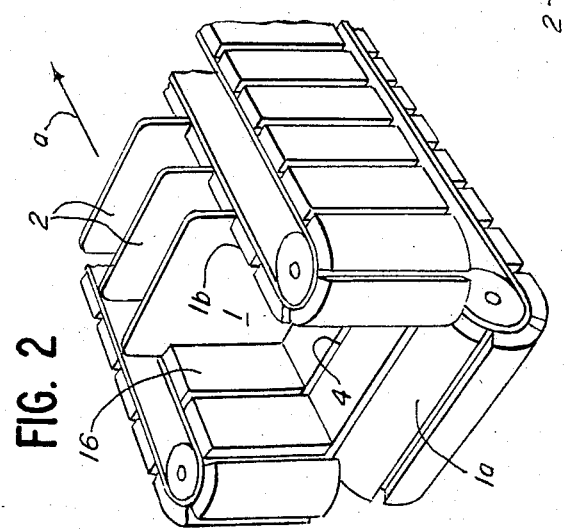
FIG. 2
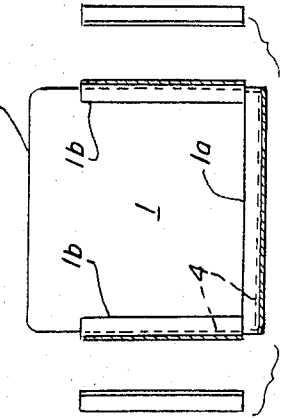
FIG. 3

4,592,273

APPARATUS FOR MAKING BREAD

BACKGROUND OF THE INVENTION

1. Field of the Invention

The present invention relates to a new and improved apparatus for making bread and more particularly apparatus for making bread wherein loaves of dough are contained in moving compartments formed on an insulated belt conveyor with a pair of electrically conductive plates on opposite sides of each compartment in contact with the dough for passing an electric current thereto through to bake the dough while it is moving along the conveyor. When baking is completed the conductive electric plates are disconnected from the power source and removed from the conveyor so that the baked loaves of bread may then be removed from the coneyor in readiness for further processing.

2. Description of the Prior Art

Baking of loaves of bread by passing an electric current through a mass of dough has been utilized heretofore and in a typical system, individual baking boxes formed of wood, plastic, or other electrically insulating material have been utilized to hold a mass of bread dough in contact with a pair of conductive electrodes formed of aluminum coated on iron plate. An electric power source is connected to the electrodes of each baking box to pass current through the dough contained therein.

These prior art systems typically require a large amount of hand labor in loading the boxes with dough, inserting the electrodes, interconnecting the electrodes with a power source and, after baking is completed, the boxes are manually disassembled and the electrodes removed manually before the baked bread loaves can be released for further processing. In many instances the large number and size of the individual bread cases needed for a mass production process require extensive storage and stacking space and in addition, the electrical baking process is relatively inefficient because the baking becomes effective on just one side of the bread loaf and the outside electric current becomes a voltaic current.

OBJECTS OF THE INVENTION

It is an object of the invention to provide a new and improved apparatus for making bread.

Still another object of the invention is to provide a new and improved apparatus for making bread which includes an endless belt conveyor having insulated surfaces and a plurality of removable, electrically conductive plates adapted to form moving baking compartments or dough slots for holding successive loaves of dough in contact with the electrical plates while passing an electric current through the dough to bake the same as the compartments move along the endless belt conveyor.

Still another object of the present invention is to provide a new and improved apparatus for making bread which eliminates the need for individual wooden or plastic bread cases and individual electrodes therefor.

Still another object of the present invention is to provide a new and improved system for making bread which is highly efficient in terms of labor and electrical power required, and which eliminates the need for large numbers of individual bread cases and the substantial storage area and stacking space normally required for mass production quantities of the individual cases.

BRIEF SUMMARY OF THE PRESENT INVENTION

Apparatus in accordance with the invention includes an endless belt conveyor having an insulated bottom belt and a pair of insulated, opposite side belts. The belts are provided with longitudinally spaced apart, transverse slots formed therein for receiving and holding removable, electrically conductive plates. Successive pairs of plates are placed on the conveyor and are adapted to form the opposite sides of a plurality of successive moving baking compartments, or dough slots along the belt. Each dough slot or compartment holds a loaf of bread dough in contact with the plates on opposite sides thereof. A moving electric power source is interconnected with each pair of plates on opposite sides of each dough slot to pass an electric current through the bread dough contained therein for baking the dough as it moves along the conveyor. When baking is completed at the outlet end of the conveyor, the electrical power is disconnected and the plates are removed to release the baked bread loaves for further processing.

BRIEF DESCRIPTION OF THE DRAWING

For a better understanding of the present invention reference should be had to the following detailed description taken in conjunction with the drawing, in which:

FIG. 1 is a side elevational view of a new and improved conveyor apparatus for making bread in accordance with the features of the present invention;

FIG. 2 is a fragmentary perspective view of an inlet end portion of the conveyor apparatus of FIG. 1;

FIG. 3 is a transverse cross sectional view taken substantially along lines 3—3 of FIG. 1;

FIG. 4 is a plan view of an electrical feed system of the conveyor apparatus in accordance with the present invention;

FIG. 5 is a side elevational view of the electrical feed system of FIG. 4;

FIG. 6 is a perspective view of a typical; individual bread case of the prior art; and FIG. 7 is a transverse cross sectional view of the bread case of FIG. 6 taken substantially along lines 7—7 of FIG. 6.

DESCRIPTION OF A PREFERRED EMBODIMENT

Referring now more particularly to the drawing, bread dough including yeast, salt, water, lard or shortening and flour is mixed in a conventional dough mixing machine and is processed through a dough divider and a roller, proofer, and molder machine into loaf size masses of dough which are partially fermented after the process described has been completed. These loaf size masses of dough are referred to by the numeral 3 and are fed in sequence from the end of a production conveyor to be picked up either manually or by a robot and deposited into individual dough slots or traveling compartments 5 at the inlet end portion of an endless belt conveyor 1 (FIG. 2). The endless belt conveyor includes a bottom belt conveyor 1a having an upper run adapted to move along a generally horizontal path as indicated by the arrow "a" in FIGS. 1 and 2.

The endless belt conveyor also includes a pair of side belts 1b on opposite sides of the bottom belt 1a and driven to move in unison or synchronism with the bottom belt. The combination of the bottom conveyor 1a and the opposite side conveyors 1b form a generally U-shaped trough, down which trough the individual loaf size masses of bread dough 3 are moved.

In accordance with the present invention, the endless belt conveyors 1a and 1b are formed of electrically insulating material and are provided with longitudinally spaced apart, transverse grooves or slots 4 at appropriate spacing intervals. Removable electrode plates 2 of aluminum, iron or steel cladded with aluminum, stainless steel or other electrically conductive material are inserted into matching aligned slots in the bottom and side wall conveyors to form successive baking compartments or dough slots 5 for receiving the loaf size masses of dough at the inlet end portion (lefthand end as viewed in FIG. 1) of the conveyor 1.

The individual electrode plates 2 are inserted into place as shown by the arrow in FIG. 1 by a robot or manually. As the bread dough moves along in the conveyor, further fermentation takes place and the dough begins to rise and expand to a higher level while confined between the pairs of conductive plates 2 on opposite sides. The fermented loaves of dough 3a substantially fill the traveling dough slots or compartments 5 as the bread moves toward the right hand end portion of the conveyor 1. After the dough has risen, the baking process is commenced by supplying electrical power to bake the loaves 3a through an electric feeder system 6 positioned adjacent the right hand or outlet end portion of the conveyor.

The electric feeder system 6 includes an insulated, endless belt conveyor 7 having a lower run spaced above the main conveyor 1 with a plurality of terminal contact members 8 carried thereby. These contact members are electrically connected to the removable plates 2 by means of clips 9 which are secured to the edges of the electrode plates. Electric current is supplied to the plates 2 of each dough slot 5 as the loaves move along the conveyor. The electric current feeding system 6 is synchronized to move in unison and at the same speed as the main conveyor 1.

Three phase, alternating current at 200 volts is supplied through lines R, S and T to successive individual terminals r, s, and t on contacts 8 through panagraphs 10 so that each compartment or dough slot 5 that is full of fermented bread dough 3a is subjected to a single phase alternating current flow passing through the cross-section of the dough between opposite side plates or electrodes 2 as the fermented dough is continuously moving along in the conveyor 1.

The electric current flow passing through the loaves of dough 3a contained in the dough slots 5 bakes the dough into bread in an efficient and continuous manner while the dough is moving along with the conveyor 1. At the outlet end of the conveyor, the electrode plates 2 are removed upwardly and outwardly as indicated by the arrow after first being disconnected from the electric terminals 8 of the electric current feed system 6. Fully baked bread loaves 3b are then discharged from the conveyor 1 and are deposited on an output conveyor 11 for travel to further processing stations and subsequent refrigeration until final grinding or crushing is accomplished if bread crumbs are to be made.

From the foregoing it will be seen that the apparatus therefor eliminates the need for great numbers of individual bread boxes like shown in the prior art system illustrated in FIGS. 6 and 7. The system of the present invention consequently eliminates the need for large storage and stacking spaces needed for mass production with the old method. In addition, the high labor costs involved with individual bread cases of the prior art are eliminated because only the conductive plates 2 need be removed from the output end of the conveyor 1 for washing before they are recycled and put back into the process by placement on the input or inlet end of the conveyor 1. The process minimizes the number of separate components involved in the baking operation. Moreover, the use of three phase, 200 volt, alternating current to bake the bread supplied on a continuous basis through a synchronized electric feed conveyor 6 makes a highly efficient use of electrical power.

Although the present invention has been described with reference to an illustrated embodiment thereof, it should be understood that numerous other modifications and embodiments can be made by those skilled in the art that will fall within the spirit and scope of the principles of this invention.

What is claimed as new and desired to be secured by Letters Patent is:

1. Apparatus for making bread comprising:
    an endless belt conveyor having an insulated bottom belt and a pair of insulated, opposite side belts, each belt having longitudinally spaced apart, transverse slots therein aligned for receiving edge portions of removable, electrically conductive plates adapted to form opposite sides of a plurality of successive baking compartments for holding bread dough in contact with the plates on opposite sides thereof; and
    an electric current source interconnected to contact the conductive plates on opposite sides of each moving compartment for passing an electric current through the dough contained therein to bake the same during movement along the conveyor until plates are removed when baking is completed.

2. The apparatus of claim 1 wherein said bottom belt and said side belts form an elongated, moving trough divided into successive separate compartments by said conductive plates along an upper, generally horizontal run of said bottom belt.

3. The apparatus of claim 2 wherein said slots in said side belts extend upwardly of said bottom belt for supporting opposite side edges of said conductive plates inserted downwardly therein.

4. The apparatus of claim 3 wherein said electric current source includes an upper endless conveyor having a lower run spaced above said conductive plates, and driven to move in synchronizm with said belt conveyor, and including a plurality of electrical connectors extending between said lower run and detachably connected with said conductive plates to supply electrical power between successive plates on said belt conveyor.

5. The apparatus of claim 4 wherein said electric current source includes a plurality of elongated power lines parallel of said belt conveyor, each of said electrical connectors adapted to provide electrical connectors adapted to provide electrical connection between a single conductive plate and a particular one of said power lines.

6. The apparatus of claim 5 wherein multiphase alternating current power is supplied to said power lines and said connectors are connected to provide single phase current between successive pairs of conductive plates on said belt conveyor.

7. The apparatus of claim 4 wherein said upper endless conveyor is spaced between point intermediate the ends of said endless belt conveyor and an outlet end thereof to supply current for baking said loaves only during an end portion of their travel along the upper run of said endless belt conveyor.

* * * * *